(12) United States Patent
Ybarra (10) Patent No.: US 6,301,102 B1
(45) Date of Patent: Oct. 9, 2001

(54) SYSTEM AND METHOD FOR PROTECTING AND DISPLAYING GRAPHICS ON A COMPUTER COMPONENT

(75) Inventor: Darren Jay Ybarra, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/406,956

(22) Filed: Sep. 28, 1999

(51) Int. Cl.$^7$ ........................................................ G06F 1/16
(52) U.S. Cl. ....................... 361/683; 361/724; 364/708.1; 292/148
(58) Field of Search ..................... 361/683, 681, 361/724, 725, 726, 727, 685, 686; 364/708.1; 248/551–553; 312/216, 218; 292/42, 148, 151, 307 R (56) References Cited

U.S. PATENT DOCUMENTS

| | | | |
|---|---|---|---|
| 4,535,376 | * | 8/1985 | Nomura et al. ........................ 360/126 |
| 5,105,338 | * | 4/1992 | Held ...................................... 361/683 |
| 5,218,474 | * | 6/1993 | Kirschner ............................. 359/601 |
| 5,328,145 |  | 7/1994 | Charapich . |
| 5,701,230 | * | 12/1997 | Liang et al. .......................... 361/681 |
| 6,064,568 | * | 5/2000 | Schmitt ................................ 361/685 |

* cited by examiner

*Primary Examiner*—Leo P. Picard
*Assistant Examiner*—Hung Van Duong
(74) *Attorney, Agent, or Firm*—Perkins Coie LLP (57) ABSTRACT

Systems and methods for protecting the external surfaces of, and displaying graphics on, a computer component are shown and described. Several embodiments of the present invention are also used to advertise goods or services on the computer component. In one embodiment, the computer component is a CPU or monitor having a housing with top and side portions. The housing is generally sized and shaped to enclose at least a portion of the computer component. The top and side portions of the housing can have external surfaces facing away from the computer component when the housing encloses the computer component. The external surfaces can have at least one first fastening area. A thin, semi-permanent and flexible cover sheet can be configured to conform to the top portion and at least one side portion of the external surface of the housing. The cover can have a receiving surface thereon configured to receive the graphics. The cover further can have at least one second fastening area releasably engageable with the first fastening area on the housing. The second fastening area can be positioned on the cover to align with the first fastening area on the housing when the cover is conformed to the housing. The second fastening area is configured to releasably engage the first fastening area and releasably retain the cover to the housing.

42 Claims, 5 Drawing Sheets

SYSTEM AND METHOD FOR PROTECTING AND DISPLAYING GRAPHICS ON A COMPUTER COMPONENT

TECHNICAL FIELD

The invention is directed to computer components and monitors and, more particularly, to systems and methods for protecting computer components or monitors, and for displaying graphics or advertisements thereon.

BACKGROUND OF THE INVENTION

A typical computer system includes a central processing unit ("CPU"), a plurality of input devices (e.g., a keyboard and a mouse), a plurality of output devices (e.g., a display and a printer), a plurality of memory devices and a power source. The computer system is commonly used for a number of years even if portions of the system are upgraded more frequently. The components of the system are accordingly designed to withstand the wear and tear associated with regular computer use over extended lengths of time.

Figure 1:
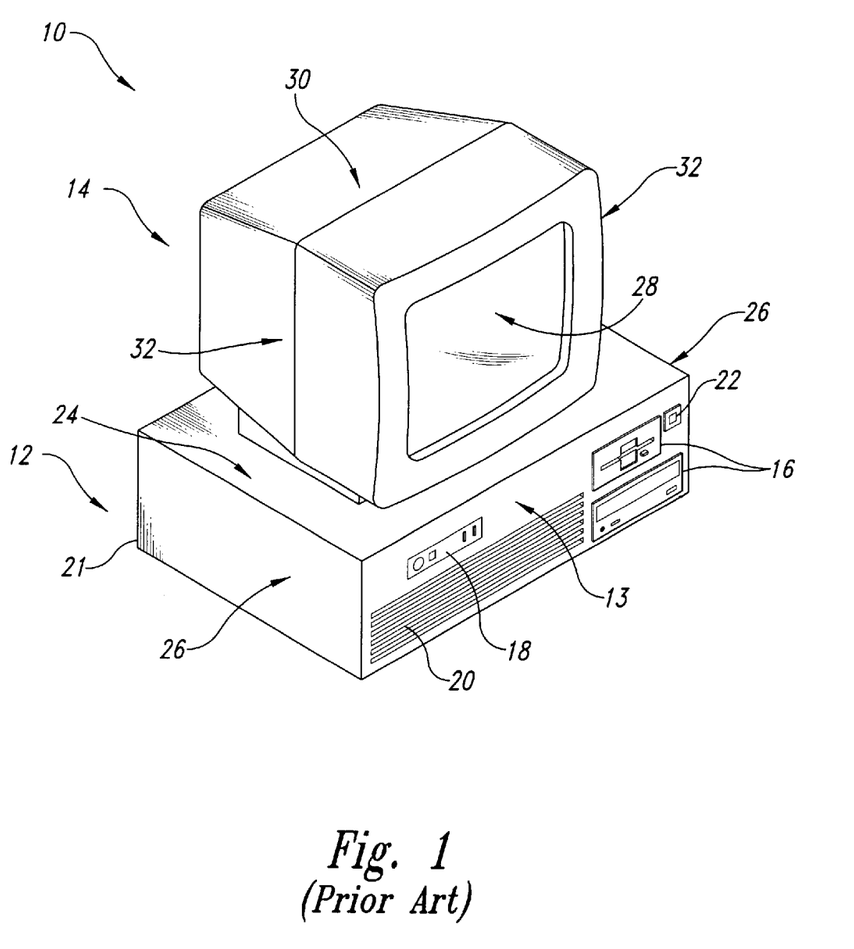
FIG. 1 is an isometric view of a computer system having a CPU and monitor according to the prior art.

FIG. 1 illustrates a portion of a typical computer system 10 according to the prior art. The computer system 10 includes a CPU 12 and a monitor 14. The CPU 12 has a housing 21 with a front panel or bezel 13, a top panel 24, and opposing side panels 26. A number of disc drives 16, controls 18 and a vent 20 are at the front panel 13. The CPU 12 also has a decal 22 or similar marking indicating the brand of the computer or one of its components. The monitor 14 has a display device including a display screen 28 for displaying information. The monitor also has a top panel 30 and opposing side panel 32.

The top and side panels 24/26 of the CPU 12 and the top and side panels 30/32 of the monitor 14 protect the electronic parts within these components. The panels 24/26/30/32 are accordingly typically manufactured from hard plastic. The top and side panels 24/26/30/32 also typically have textured surfaces to camouflage scratches, nicks, dings, fingerprints, smudges, etc. Such blemishes would likely be immediately apparent on smooth, glossy surfaces without a textured finish. The textured finish, however, diffuses light reflecting off the surfaces so that blemishes blend with the textured surface. As a result, CPUs and monitors with textured surfaces can be used for longer periods of time before they look excessively worn.

CPUs and monitors with textured surfaces, however, have a number of disadvantages. First, because the surface is textured, it is more difficult to clean than a smooth surface. Textured surfaces eventually can become dingy with grease, dirt, etc., from fingerprints, dust or contact with other items. Second, ultraviolet light, such as sunlight radiating through a window, damages plastic. After a long period of time, for example, sunlight bleaches or "yellows" plastic surfaces. Such damage from ultraviolet rays is often irreversible. As discussed above, the housing of a component may need to be replaced to provide an acceptable appearance.

Temporary covers have been developed to protect the computer during periods of non-use. These covers typically have been oversized shrouds, or dust covers, that loosely encase the entire component and prevent dust from collecting on the component during periods of non-use. These covers, however, generally do not protect the computer during use because they must be removed to access the computer components. Additionally, these covers are inconvenient because the user must remove and replace these covers each time the computer is used. Moreover, if the user fails to replace the cover after using the computer, the computer will not be protected.

As introduced above, a sticker 22 or decal can also be placed on the computer bearing the name of the entity that manufactured the computer or one of its components. Stickers and decals, however, do not generally protect computer components because they only cover a small percentage of the surface area of a computer component. Moreover, it may not be acceptable, such as in a professional office environment, to affix decals to a computer. Stickers and decals are further problematic because they are difficult to remove and leave a tacky residue. Thus, stickers and decals are not protective devices, and they are generally undesirable because they are virtually permanent fixtures of the computer component.

SUMMARY OF THE INVENTION

The present invention is directed toward systems and methods for protecting the external surfaces of computer components. Several embodiments of the present invention are also directed toward displaying graphics on computer components for enhancing the aesthetics of computer systems and/or advertising goods and services.

One computer system of the invention has a computer component with internal devices, a housing enclosing at least a portion of the internal devices, and a protective cover releasably attached to the housing. The computer component can be a CPU, monitor, keyboard, printer or other type of computer device. A CPU for example, typically has a number of internal devices including a processor, at least one memory device and a power supply. The housing is generally sized and shaped to enclose at least a portion of the internal devices of the computer component. The housing, for example, can have a front bezel, a top portion and a side portion. The top and side portions are configured to releasably engage the bezel. The top and side portions of the housing can have external surfaces facing away from the internal devices of the computer component. At least one of the external surfaces can have at least one first fastening area to releasably hold the cover to the housing.

The flexible cover can be a thin, semi-permanent sheet configured to conform to the top portion and at least one side portion of the external surface of the housing without interfering with the operation of the computer component. The cover can have a receiving surface configured to receive the graphics. The cover further can also have at least one second fastening area releasably engageable with the first fastening area on the housing. The second fastening area can be positioned on the cover to align with the first fastening area on the housing when the cover conforms to the housing, and can releasably engage the first fastening area to releasably retain the cover to the housing and display the graphics on the computer component. The cover can remain attached to the housing while a user operates the computer, and the cover can be quickly replaced when it is worn. Thus, the cover protects the housing when it is most likely to be damaged, and it can easily be replaced to change or enhance the aesthetics of the computer.

In another embodiment of the present invention, graphics can be displayed on the computer component by printing the graphics on the cover. For example, one method of the invention for displaying graphics and/or information on a housing of a computer component includes printing information on the cover, conforming the cover to the contour of the top and side portions of the housing, and releasably attaching the cover to the housing. The cover can accordingly be used to advertise goods or services, or to change the aesthetics of the computer.

DETAILED DESCRIPTION OF THE INVENTION

The present detailed description is generally directed toward methods and systems for displaying graphics on computer components and protecting the external surfaces of computer components. Many specific details of certain embodiments of the invention are set forth in the following description and in FIGS. 2–8 to provide a thorough understanding of such embodiments. One skilled in the art, however, will understand that the present invention may have additional embodiments, or that the invention may be practiced without several of the details described in the following description.

Figure 2:
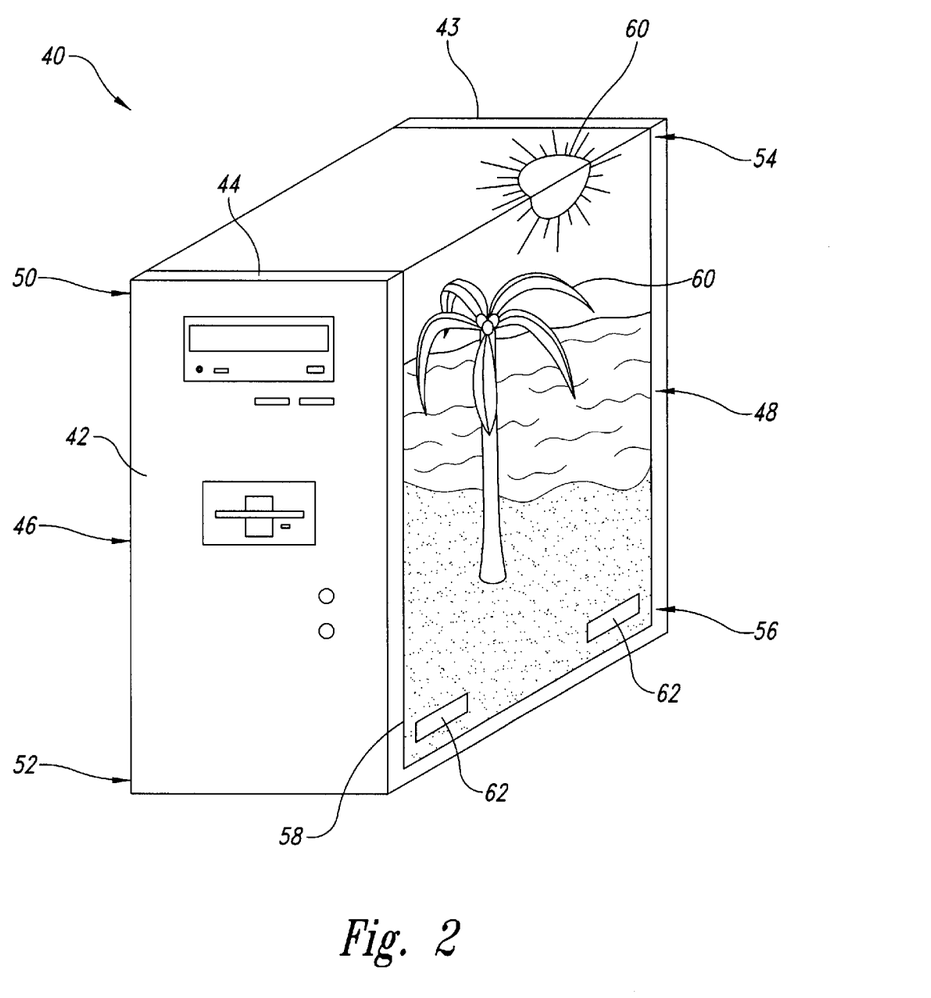
FIG. 2 is an isometric view of a computer component and a protective system for protecting a housing of the component and displaying graphics thereon according to an embodiment of the present invention.

FIG. 2 illustrates a computer component 40 having a protective system including a housing 43 and a protective cover 58 according to one embodiment of the present invention. The computer component 40 can be a central processing unit including a processor, memory devices, power supplies and other internal devices. The housing 43 can have a bezel 42, a top portion 44, a first side portion 46, and an opposing second side portion 48. The first side portion 46 can have a first upper portion 50 and an opposing first lower portion 52, and the second side portion 48 similarly can have a second upper portion 54 and an opposing second lower portion 56. The top portion 44 and the side portions 46/48 can be releasably engaged with the bezel 42 to enclose the internal components (not shown) of the computer component 40 and to allow access to the internal components for repair or replacement. In the illustrated embodiment, the computer component 40 is substantially rectilinear and has a height greater than its width. The computer component 40, and particularly the housing 43, can have different shapes or sizes.

The protective cover 58 can be a thin, flexible sheet that covers all of the top portion 44 and the first and second side portions 46/48. In the illustrated embodiment, a number of graphics 60 are printed on or otherwise attached to the cover 58. The graphics 60 and the portions of the cover 58 not having graphics can be opaque, transparent or translucent. The cover 58 can be manufactured from thin, flexible polymeric materials, such as Mylar, or it can be manufactured from other thin, flexible materials (e.g., cloth or rubber). In the illustrated embodiment, the graphics 60 are artistic, but the graphics 60 can also be any combination of random designs, patterns, text, company names and/or logos.

In the embodiment shown in FIG. 2, the cover 58 closely conforms to the top portion 44 and the first and second side portions 46/48 of the computer component. The cover 58 can also be stretched taut and smooth over the surface of the housing 43. The cover 58 can extend over the entire top and side portions 44/46/48, or it can extend over only a portion of one or all of these surfaces. The cover 58 instead can be sized to fit loosely over the housing 43, or it can be resiliently stretched to cover the desired surfaces.

Figure 3:
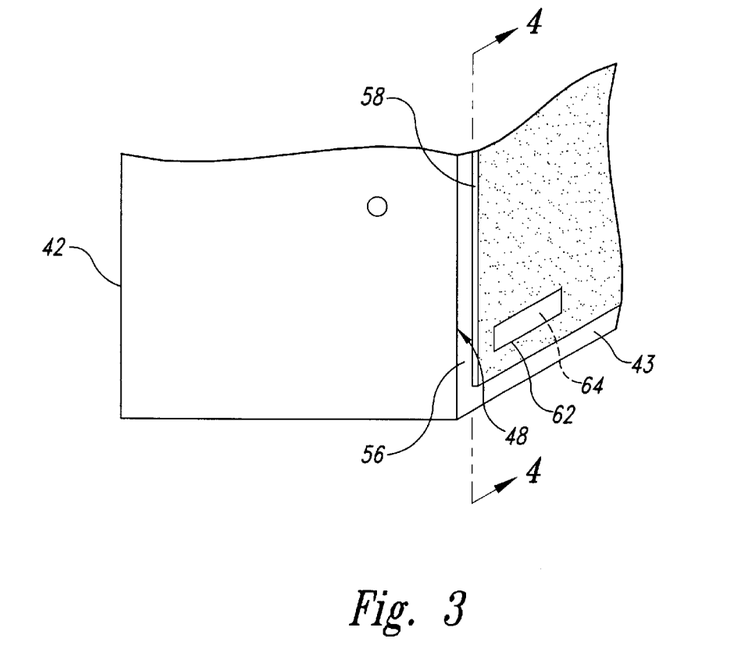
FIG. 3 is an enlarged isometric view partially illustrating the housing of the computer component and the protective system of FIG. 2.

As best illustrated in FIG. 3, the housing 43 and the cover 58 can have a number of fasteners 62 to releasably retain the cover 58 to the housing 43. The fasteners 62 generally hold the cover 58 so that it closely conforms to the contour of the housing 43. In one particular embodiment, two fasteners 62 are positioned near the lower portion 56 of the second side portion 48, and similarly two fasteners 62 are positioned near the lower portion 52 of the first side portion 46 (not shown). The protective system can use more or fewer fasteners 62, or the fasteners can be at different locations on the housing 43. As discussed in detail below, the fasteners 62 releasably attach the cover 58 to the housing 43 so that a used or worn cover 58 can be easily removed, replaced or exchanged with a new cover 58.

Figure 4:
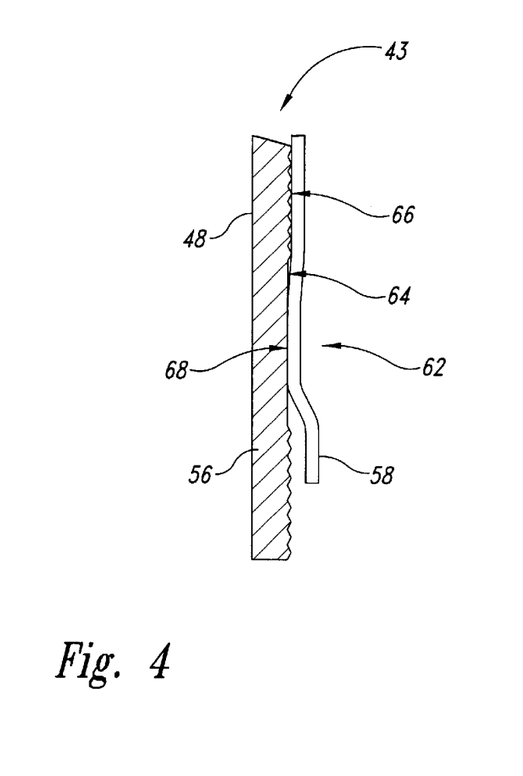
FIG. 4 is a cross-sectional view of the housing of the computer component and the protective system of FIG. 3, viewed along Section 4—4.

FIG. 4 illustrates one embodiment of the fastener 62. The fastener 62 can have a first fastening area 64 near the second lower portion 56 of the second side portion 48. In the illustrated embodiment, second side portion 48 has an exterior surface with a textured region 66 and the first fastening area 64 is a smooth, non-textured area surrounded by the textured region 66. The first fastening area 64 can be rectangular, oval, circular or other sizes and shapes.

The fastener 62 can also have a second fastening area 68 configured on the cover 58 to align with the first fastening area 64 on the housing 43 when the cover 58 is placed on the housing 43. In the illustrated embodiment, the second fastening area 68 is a smooth polymeric material that electrostatically adheres to the first fastening area 64. The size, shape and location of the second fastening area 68 can also vary to align with the size, shape and location of the first fastening area 64. Similarly, the entire housing 43 can have a smooth finish on its external surface 66 and/or the entire cover 58 can be manufactured from a flexible, polymeric material so that any portion of the cover 58 releasably adheres to any portion of the housing 43 by electrostatic adhesion.

During operation, the cover 58 can be releasably attached to the housing 43 of the computer component 40. The cover 58 can accordingly be removed or replaced with a different cover whenever the user or computer manufacturer desires. The cover 58, for example, can be attached to a used housing 43 to give the housing a new appearance, or the cover 58 can be attached to a new housing 43 to protect the housing from damage and give the computer component 40 a desired aesthetic appeal. The computer component 40, therefore, can always maintain a new appearance or regularly display different artistic designs.

In one particular embodiment, the cover 58 can be used to advertise goods or services to the users. A computer manufacturer, for example, can sell advertising space on its computer components, design covers 58 bearing the advertisements, and attach the covers to the computer components prior to delivery. The computer manufacturer can accordingly generate additional revenue by selling advertising space on computer components.

In contrast to computer components without a protective system, the housing 43 does not become dirty or damaged. Instead, a used or dirty cover 58 can be replaced with a new cover. Unlike stickers or other decals, moreover, the cover 58 can be removed from the housing without leaving a tacky residue because the electrostatic adhesion does not use a separate adhesive. Therefore, the cover 58 provides a quick, clean protective device that can also be an effective advertising medium.

Figure 5:
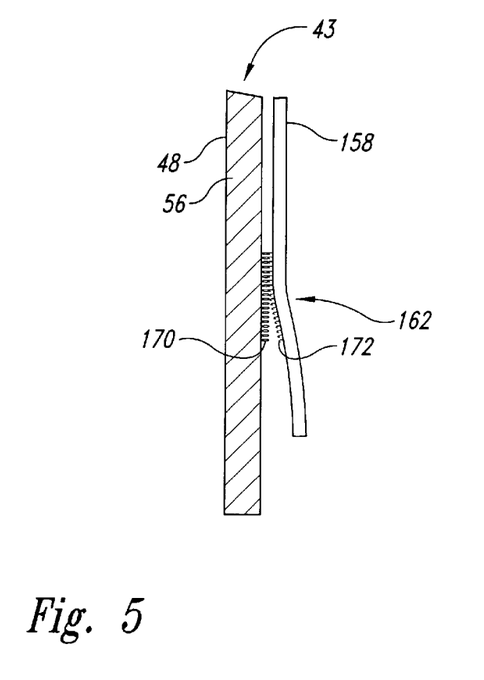
FIG. 5 is a cross-sectional view partially illustrating a housing of a computer component and a system for protecting the component and displaying graphics thereon according to another embodiment of the present invention.

FIG. 5 illustrates a system for protecting or displaying graphics on the housing 43 according to another embodiment of the present invention. In this particular embodiment, a protective cover 158 is attached to the side portion by a fastener 162 having a plurality of loops 170 attached to the housing 43 and a plurality of hooks 172 attached to the cover 158. The hooks 172 are attached to the cover 158 at a point configured to align with the loops 170 when the cover 158 is mounted to the housing 43. Another fastener similar to the fastener 162 can also be located on the first side portion 46 of the housing 43. The fastener 162 can be inverted so that the loops 170 are attached to the cover 58 and the hooks 172 are attached to the housing 43. In one example, the loops and hooks are Velcro®.

Figure 6:
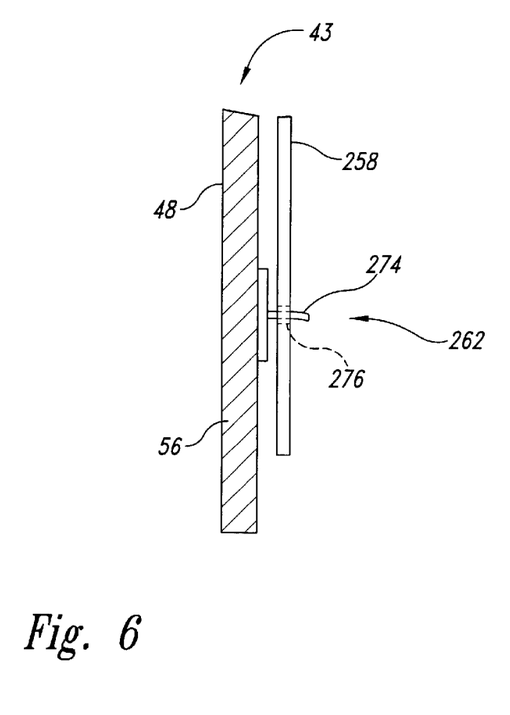
FIG. 6 is a cross-sectional view partially illustrating a housing of a computer component and a system for protecting the component and displaying graphics thereon according to yet another embodiment of the present invention.

FIG. 6 illustrates another system for protecting or displaying graphics on the housing 43 of a computer component according to another embodiment of the present invention. In this particular embodiment, a protective cover 258 is attached to the second side portion 48 by a fastener 262 having a protuberance 274 attached to the housing 43 and an opening 276 in the cover receiving the protuberance 274. The protuberance 274 projects outward from the housing 43 near the second lower portion 56 of the second side portion 48. The opening 276 is located on the cover 258 to align with the protuberance 274 when the cover 258 is wrapped around the housing 43. Another fastener similar to fastener 262 can be located on the first side portion 46 of the housing 43.

Figure 7:
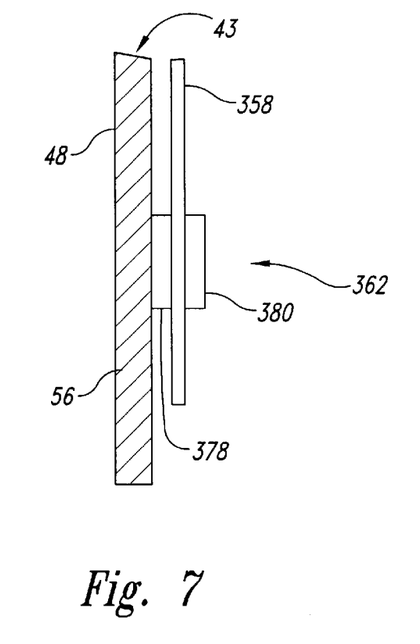
FIG. 7 is a cross-sectional view partially illustrating a housing of a computer component and a system for protecting the component and displaying graphics thereon according to still another embodiment of the present invention.

FIG. 7 illustrates yet another system for protecting or displaying graphics on a computer component according to yet another embodiment of the present invention. In this particular embodiment, a cover 358 is releasably attached to the housing 43 by a fastener 362 at the second lower portion 56 of the second side portion 48. The fastener 362 can include a metallic member 378 attached to the housing 43 and a magnet 380 attached to the cover 358 at a point configured to align with the metallic member 378 when the cover 358 wraps around the housing 43. The magnet 380 can be oriented to attract the metallic member 378 and retain the cover 358 to the housing 43. The metallic member 378 can similarly be attached to the cover 358 and the magnet 380 attached to the housing 43. The housing 43 can likewise be manufactured in whole or part of a metallic material, and the magnet 380 can be attached to the cover 358. Another fastener similar to fastener 362 can be located on the first side portion 46 of the housing 43.

Figure 8:
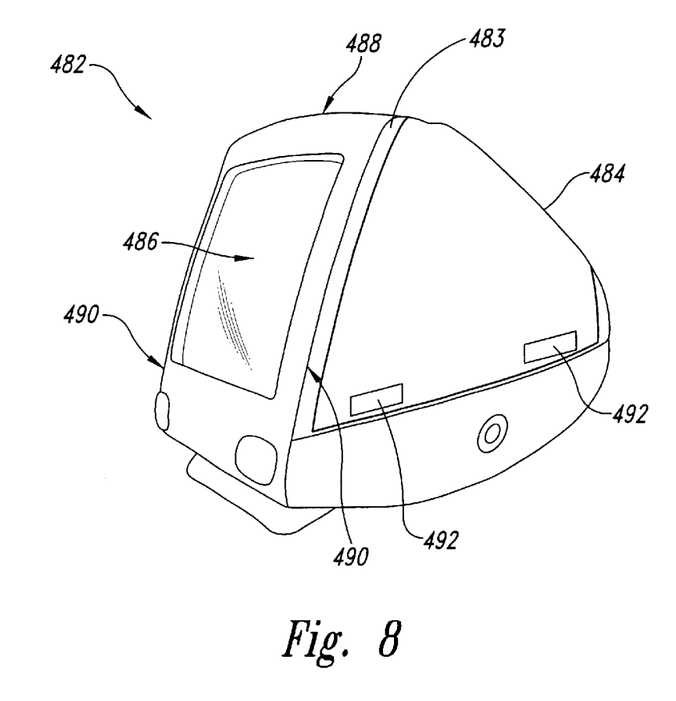
FIG. 8 is a computer monitor and a protective system for displaying graphics thereon according to still another embodiment of the present invention.

FIG. 8 illustrates another computer component, such as a monitor 482, and a cover 484 for protecting or displaying graphics on the monitor 482 according to yet another embodiment of the present invention. The monitor 482 can have a display 486 and a housing 483 including a top portion 488 and two opposing side portions 490. The cover 484 and the housing 483 can be sized and shaped to closely conform to some or all of the top portion 488 and side portions 490. The cover 484 and the housing 483 can have a number of fasteners 492 for releasably attaching the cover 484 to the housing 483. The fasteners 492 can be substantially the same or even identical to the fasteners 62 described above with reference to FIGS. 2–7.

From the foregoing it will be appreciated that, although specific embodiments of the invention have been described herein for purposes of illustration, various modifications may be made without deviating from the spirit and scope of the invention. For example, the covers for protecting the housings can conform to other computer components, such as keyboards, printers, joysticks and mice. Accordingly, the invention is not limited except as by the appended claims.

What is claimed is:

1. A protected computer system comprising:

a computer component having a processor and at least one memory device, the processor and at least one memory device being selectively engageable with a power supply;

a housing enclosing at least a portion of the computer component, the housing having a front bezel, a top portion and at least two side portions, the top and side portions being configured to releasably engage the bezel, and the top and side portions having external surfaces facing away from the computer component, at least one external surface of the top portion or the side portions having a first fastening area; and a thin, semi-permanent and flexible cover sheet configured to conform to the external surface of the top portion and the external surface of at least one side portion of the housing, and the cover having at least one second fastening area releasably engageable with the first fastening area on the housing, the second fastening area being configured on the cover to align with the first fastening area on the housing when the cover conforms to the housing to releasably retain the cover to the housing.

2. The system of claim 1 wherein the flexible cover sheet comprises a plastic sheet, the first fastening area comprises a smooth surface, and the second fastening area comprises a polymeric material releasably engageable by electrostatic adhesion with the smooth surface of the first fastening area.

3. The system of claim 1 wherein each side portion of the housing has an upper area adjacent the top portion of the housing and a lower area opposite the upper area, and wherein the flexible cover sheet comprises a polymeric material, the first fastening area comprises a smooth surface located within the lower area of each side portion, and the second fastening area comprises the polymeric material of the cover sheet releasably engageable by electrostatic adhesion with the smooth surface of the first fastening area.

4. The system of claim 1 wherein one of the first and second fastening areas comprises a plurality of loops and the other of the first and second fastening areas comprises a plurality of hooks.

5. The system of claim 1 wherein the first fastening area comprises at least one protuberance and the second fastening area comprises at least one opening configured to receive the protuberance when the cover is closely received by the housing.

6. The system of claim 1 wherein one of the first and second fastening areas comprises a metallic material and the other of the first and second fastening areas comprises a magnet configured to contact the metallic material when the cover conforms to the housing.

7. The system of claim 1 wherein the cover is manually flexible.

8. The system of claim 1 wherein the cover is substantially transparent.

9. A protected computer monitor system, comprising:
   a display device selectively engageable with a power supply;
   a housing enclosing a portion of the display device, the housing having a top portion and at least two side portions, the top and side portions having external surfaces facing away from the display device, and at least one of the external surfaces having a first fastening area; and
   a thin, semi-permanent and flexible cover sheet configured to conform to the external surface of the top portion and the external surface of at least one side portion of the housing, and the cover having at least one second fastening area releasably engageable with the first fastening area on the housing, the second fastening area being configured on the cover to align with the first fastening area on the housing when the cover conforms to the housing to releasably retain the cover to the housing.

10. The system of claim 9 wherein the flexible cover sheet comprises a plastic sheet, the first fastening area comprises a smooth surface, and the second fastening area comprises a polymeric material releasably engageable by electrostatic adhesion with the smooth surface of the first fastening area.

11. The system of claim 9 wherein each side portion of the housing has an upper area adjacent the top section of the housing and a lower area opposite the upper area, and wherein the flexible cover sheet comprises a polymeric material, the first fastening area comprises a smooth surface located within the lower area of each side portion, and the second fastening area comprises the polymeric material of the cover sheet releasably engageable by electrostatic adhesion with the smooth surface of the first fastening area.

12. The system of claim 9 wherein one of the first and second fastening areas comprises a plurality of loops and the other of the first and second fastening areas comprises a plurality of hooks.

13. The system of claim 9 wherein the first fastening area comprises at least one protuberance and the second fastening area comprises at least one opening configured to receive the protuberance when the cover is closely received by the housing.

14. The system of claim 9 wherein one of the first and second fastening areas comprises a metallic material and the other of the first and second fastening areas comprises a magnet configured to contact the metallic material when the cover conforms to the housing.

15. A protection assembly for protecting a computer component, comprising:
   a housing configured to enclose at least a portion of the computer component, the housing having a top portion and at least two side portions, each side portion having an upper area adjacent the top portion of the housing and a lower area opposite the upper area, the top and side portions of the housing having external surfaces, and the external surface of each side portion having at least one first fastening area; and
   a thin, semi-permanent and flexible cover sheet configured to conform to the top and side portions of the housing, the cover sheet having at least two second fastening areas releasably engageable with the first fastening areas on the housing, the second fastening areas being configured on the cover to align with the first fastening areas on the side portions of the housing when the cover conforms to the housing to releasably retain the cover to the housing and protect the external surface of the housing.

16. The assembly of claim 15 wherein the flexible cover sheet comprises a plastic sheet, the first fastening area comprises a smooth surface, and the second fastening area comprises a polymeric material releasably engageable by electrostatic adhesion with the smooth surface of the first fastening area.

17. The assembly of claim 15 wherein each side portion of the housing has an upper area adjacent the top portion of the housing and a lower area opposite the upper area, and wherein the flexible cover sheet comprises a polymeric material, the first fastening area comprises a smooth surface located within the lower area of each side portion, and the second fastening area comprises the polymeric material of the cover sheet releasably engageable by electrostatic adhesion with the smooth surface of the first fastening area.

18. A method for displaying graphical information at a desired location on an external surface of a computer component housing, the housing having top and side portions, the method comprising:
   closely conforming a cover having graphical information printed thereon to the top and side portions of the external surface of the housing such that the graphical information is adjacent the desired location on the external surface of the housing; and
   releasably attaching the cover to the housing.

19. The method of claim 18 wherein the housing has at least one first fastening area and the cover has at least one complementary second fastening area, and wherein releasably attaching the cover to the housing comprises engaging the second fastening area with the first fastening area.

20. The method of claim 18 wherein the housing has at least one smooth area and the cover has at least one flexible polymeric surface located to align with the smooth area when the cover is closely conformed to the housing, and wherein releasably attaching the cover to the housing comprises conforming the cover to the housing and electrostatically adhering the polymeric surface to the smooth surface to retain the cover to the housing.

21. A method for displaying graphical information at a desired location on a computer component having a housing with a top portion, opposing side portions and an external surface, the method comprising:
   tensioning a thin, flexible cover having graphical information thereon to closely conform the cover to at least a portion of the top and side portions of the housing in a tensioned configuration in which the graphical information is adjacent the desired location on the external surface of the housing; and
   releasably attaching the cover to the housing in the tensioned configuration.

22. The method of claim 21 wherein the housing has at least one first fastening area and the cover has at least one complementary second fastening area, and wherein releasably attaching the cover to the housing comprises engaging the second fastening area with the first fastening area.

23. The method of claim 21 wherein the housing has at least one smooth area and the cover has at least one flexible polymeric surface located to align with the smooth area when the cover is closely conformed to the housing, and wherein releasably attaching the cover to the housing comprises conforming the cover to the housing and electrostatically adhering the polymeric surface against the smooth surface to retain the cover to the housing.

24. The method of claim 21, further comprising:

detaching the cover from the housing and removing the cover from the housing;

tensioning a thin, flexible second cover having graphical information thereon to closely conform the second cover to at least a portion of the top and side portions of the housing in a tensioned configuration in which the graphical information is adjacent the desired location of the external surface of the housing; and releasably attaching the second cover to the housing in the tensioned configuration.

25. The method of claim 22, further comprising:

disengaging the second fastening area from the first fastening area and removing the cover from the housing;

tensioning a thin, flexible second cover having graphical information thereon to closely conform the second cover to at least a portion of the top and side portions of the housing in a tensioned configuration in which the graphical information is adjacent the desired location of the external surface of the housing; and engaging a third fastening area of the second cover to the third fastening area of the housing to releasably attach the cover in its the tensioned configuration.

26. A method of advertising goods or services on a computer component, the computer component having a housing with a top portion and opposing side portions, the method comprising:

tensioning a cover having graphics thereon to closely conform the cover to at least a portion of the top and side portions of the housing in a tensioned configuration in which the graphical information is adjacent a desired location on the external surface of the housing; and releasably attaching the cover to the housing in the tensioned configuration.

27. The method of claim 26 wherein the housing has at least one first fastening area and the cover has at least one complementary second fastening area, and wherein releasably attaching the cover to the housing comprises engaging the second fastening area with the first fastening area.

28. The method of claim 26 wherein the housing has at least one smooth area and the cover has at least one flexible polymeric surface located to align with the smooth area when the cover is closely conformed to the housing, and wherein releasably attaching the cover to the housing comprises conforming the cover to the housing and electrostatically adhering the polymeric surface against the smooth surface to retain the cover to the housing.

29. A method for protecting an external surface of a housing for a computer component, the housing having top portion and first and second side portions, the first and second side portions each having an upper portion adjacent the top portion and a lower portion opposite the upper portion, the method comprising:

closely conforming a cover having a first edge and an opposing second edge to the top and side portions of the external surface of the housing in a configuration in which a user can operate the computer component while the cover is attached thereto;

releasably attaching a point near the first edge of the cover to the lower portion of the first side portion of the housing; and releasably attaching a point near the second side of the cover to the lower portion of the second side portion of the housing.

30. A protected computer system comprising:

a computer component having a processor and at least one memory device, the processor and at least one memory device being selectively engageable with a power supply;

a housing enclosing at least a portion of the computer component, the housing having a front bezel, a top portion and at least two side portions, the top and side portions being configured to releasably engage the bezel, and the top and side portions having external surfaces facing away from the computer component, at least one external surface of the top portion or the side portions having a first fastening area; and a thin, semi-permanent and flexible cover sheet conforming to the external surface of the top portion and the external surface of at least one side portion of the housing, the cover having at least one second fastening area aligned with and releasably engaging the first fastening area on the housing to releasably retain the cover to the housing.

31. The system of claim 30 wherein the flexible cover sheet comprises a plastic sheet, at least a portion of each of the external surfaces being textured, the first fastening area comprises a smooth surface, and the second fastening area comprises a polymeric material releasably engaging the smooth surface of the first fastening area by electrostatic adhesion.

32. The system of claim 30 wherein each side portion of the housing has an upper area adjacent the top portion of the housing and a lower area opposite the upper area, and wherein the flexible cover sheet comprises a polymeric material, the first fastening area comprises a smooth surface located within the lower area of each side portion, and the second fastening area comprises an inner surface of the polymeric material of the cover sheet releasably engaging the smooth surface of the first fastening area by electrostatic adhesion.

33. The system of claim 30 wherein one of the first and second fastening areas comprises a plurality of loops and the other of the first and second fastening areas comprises a plurality of hooks.

34. The system of claim 30 wherein the first fastening area comprises at least one protuberance and the second fastening area comprises at least one opening configured to receive the protuberance when the cover is closely received by the housing.

35. The system of claim 30 wherein one of the first and second fastening areas comprises a metallic material and the other of the first and second fastening areas comprises a magnet configured to contact the metallic material when the cover conforms to the housing.

36. A protected computer monitor system, comprising:

a display device selectively engageable with a power supply;

a housing enclosing a portion of the display device, the housing having a top portion and at least two side portions, the top and side portions having external surfaces facing away from the display device, and at least one of the external surfaces having a first fastening area; and a thin, semi-permanent and flexible cover sheet conforming to and covering a majority of the external surface of the top portion and conforming to the external surface of at least one side portion of the housing, the cover having at least one second fastening area aligned with and releasably engaging the first fastening area on the housing to releasably retain the cover to the housing.

37. The system of claim 36 wherein the flexible cover sheet comprises a plastic sheet, the first fastening area comprises a smooth surface, and the second fastening area comprises a polymeric material releasably engageable by electrostatic adhesion with the smooth surface of the first fastening area.

38. The system of claim 36 wherein each side portion of the housing has an upper area adjacent the top section of the housing and a lower area opposite the upper area, and wherein the flexible cover sheet comprises a polymeric material, the first fastening area comprises a smooth surface located within the lower area of each side portion, and the second fastening area comprises the polymeric material of the cover sheet releasably engageable by electrostatic adhesion with the smooth surface of the first fastening area.

39. The system of claim 36 wherein one of the first and second fastening areas comprises a plurality of loops and the other of the first and second fastening areas comprises a plurality of hooks.

40. The system of claim 36 wherein the first fastening area comprises at least one protuberance and the second fastening area comprises at least one opening configured to receive the protuberance when the cover is closely received by the housing.

41. The system of claim 36 wherein one of the first and second fastening areas comprises a metallic material and the other of the first and second fastening areas comprises a magnet configured to contact the metallic material when the cover conforms to the housing.

42. A protection assembly for protecting a computer component, comprising:

a housing configured to enclose at least a portion of the computer component, the housing having a top portion and at least two side portions, each side portion having an upper area adjacent the top portion of the housing and a lower area opposite the upper area, the top and side portions of the housing having external surfaces, and the external surface of each side portion having at least one first fastening area; and a thin, semi-permanent and flexible cover sheet conforming to the external surfaces of the top and side portions of the housing, the cover sheet having at least two second fastening areas releasably engageable with the first fastening areas on the housing, the second fastening areas being aligned with and releasably engaging the first fastening areas to releasably retain the coversheet to the housing and protect the external surface of the housing.

* * * * *

UNITED STATES PATENT AND TRADEMARK OFFICE
CERTIFICATE OF CORRECTION

PATENT NO.    : 6,301,102 B1
DATED         : October 9, 2001
INVENTOR(S)   : Ybarra It is certified that error appears in the above-identified patent and that said Letters Patent is hereby corrected as shown below:

Column 10,
Line 26, "being textured, the" should be -- being textured. The --;

Signed and Sealed this

Fourth Day of June, 2002

Attest:

Attesting Officer

JAMES E. ROGAN
Director of the United States Patent and Trademark Office